(12) United States Patent
Card (10) Patent No.: US 11,643,040 B2
(45) Date of Patent: *May 9, 2023

(54) STEERING WHEEL ASSEMBLY HAVING PIVOTABLE AIRBAG MODULE

(71) Applicant: Rivian IP Holdings, LLC, Plymouth, MI (US)

(72) Inventor: Gary Andrew Card, Macomb, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/243,806

(22) Filed: Apr. 29, 2021

(65) Prior Publication Data

US 2021/0245695 A1 Aug. 12, 2021

Related U.S. Application Data

(63) Continuation of application No. 16/445,634, filed on Jun. 19, 2019, now Pat. No. 11,021,125.

(60) Provisional application No. 62/686,806, filed on Jun. 19, 2018.

(51) Int. Cl.
*B60R 21/203* (2006.01)
*B62D 1/10* (2006.01)

(52) U.S. Cl.
CPC ........ *B60R 21/203* (2013.01); *B60R 21/2037* (2013.01); *B62D 1/10* (2013.01)

(58) Field of Classification Search
CPC .............. B60R 21/203; B60R 21/2032; B60R 21/2035; B60R 21/2037; B62D 1/10
See application file for complete search history.

(56) References Cited

U.S. PATENT DOCUMENTS

| | | | |
|---|---|---|---|
| 5,620,201 A * | 4/1997 | Ricks | ................... B60R 21/2035 280/732 |
| 6,951,348 B2 | 10/2005 | Enders | |
| 7,052,035 B2 * | 5/2006 | Kreuzer | .............. B60R 21/2037 200/61.55 |
| 11,021,125 B2 * | 6/2021 | Card | ................... B60R 21/2037 |
| 2014/0306430 A1 | 10/2014 | Scott et al. | |

* cited by examiner

*Primary Examiner* — Laura Freedman
(74) *Attorney, Agent, or Firm* — Clements Bernard Walker; Christopher L. Bernard (57) ABSTRACT

A steering wheel assembly includes a steering wheel and an airbag module. The steering wheel includes a hub portion that has a hook member and a first bracket opposed to the hook member and having an access hole. The airbag module is pivotably attached to the hub portion of the steering wheel and includes a latch member and a second bracket opposed to the latch member and having an access hole. The latch member is pivotably attached to the hook member, and the first bracket and the second bracket overlap with each other such that the access holes form a port that receives a fastener.

14 Claims, 6 Drawing Sheets

STEERING WHEEL ASSEMBLY HAVING PIVOTABLE AIRBAG MODULE

CROSS-REFERENCE TO RELATED APPLICATIONS

This application is a continuation of U.S. patent application Ser. No. 16/445,634 filed on Jun. 19, 2019 which claims priority to and the benefit of U.S. Provisional Patent Application No. 62/686,806, filed on Jun. 19, 2018. The disclosure of the above application is incorporated herein by reference in its entirety.

INTRODUCTION

The present disclosure relates to a steering wheel assembly having an airbag module and a steering wheel, and more particularly, a fastening mechanism for attaching the airbag module to the steering wheel.

The statements in this section merely provide background information related to the present disclosure and may not constitute prior art.

Subassemblies in motor vehicles, such as a steering wheel assembly, are equipped with an airbag module to buffer the impact to a passenger in the event of an accident. For example, a driver side airbag includes an airbag module fastened to a hub of the steering wheel. In one form, while the airbag module is fastened to be firmly secured within the hub of the steering wheel, it is also configured to be detachable from the steering wheel in order to undergo service and/or repair.

Devices for fastening an airbag module include snap-in fasteners and bolt-in fasteners. For example, in one form of a snap-in fastener, the airbag module includes elastically deformable hooks (i.e., a spring member) that engage with latching portions provided along the hub of the steering wheel. As the airbag module is installed, the hooks slide along the latching portions and elastically deform until the hooks spring back into a final engagement position with the latching portion to secure the airbag module to the steering wheel. With bolt-in fasteners, threaded inserts located on opposed sides of the airbag module are aligned with threaded inserts located along the hub of the steering wheel. The aligned threaded inserts receive a bolt to secure the airbag module to the steering wheel.

To implement a snap-in fastener, the steering wheel is required to have a fixture member that has a feature for receiving a spring member of the snap-in fastener. In addition, the snap-in fasteners generally require over-travel to engage with the steering wheel and thus, require additional clearance. The bolt-in fastening method requires fasteners and threaded inserts. Both fastening methods also require some sort of hole or plug in order to access the engagement feature (e.g., spring or bolt) and detach the airbag module from the steering wheel. In some instances, the access holes are visible by the driver and can diminish the appearance of the steering wheel.

SUMMARY

This section provides a general summary of the disclosure, and is not a comprehensive disclosure of its full scope or all of its features.

In one form, the present disclosure provides a steering wheel assembly that includes a steering wheel, an airbag module attached to the steering wheel, a latch fastener, and an access fastener. The latch fastener includes a bar member disposed at the airbag module and a hook member disposed at the steering wheel. The hook member defines a slot configured to receive and engage with the bar member such that the steering wheel and the airbag module are pivotably attached. The access fastener includes a first bracket extending from the airbag module and a second bracket extending from the steering wheel. The first bracket and the second bracket each define an access hole that form a port for receiving a fastener to attach the airbag module to the steering wheel.

In one variation, the bar member is a linear shaped bar. Alternatively, the bar member is a curve shaped bar having a central arch extending a first direction, and a pair of bow members on either side of the central arc. In this form, at least one of the central arch or the pair of bow members contact respective surface of the slot.

In another variation, the steering wheel assembly further comprises at least two of the latch fasteners.

In other variations, the access fastener may be arranged such that the port formed by the access holes is at a 6-o'clock position about the steering wheel, the airbag module may include a horn actuator and an inflatable airbag, and/or the access holes of at least one of the first bracket and the second bracket may define threads that are configured to engage with the fastener.

In another form, the present disclosure provides a steering wheel assembly comprising a steering wheel including a hub portion, and an airbag module pivotably attached to the hub portion. In this form, the hub portion of the steering wheel includes a hook member and a first bracket opposed to the hook member. The hook member defines a slot and the first bracket defines a first access hole. The airbag module has a front face and a back face, wherein the back face includes a latch member and a second bracket opposed to the latch member, the latch member includes a bar member and the second bracket defines a second access hole. The bar member engages with the slot of the hook member, and the first bracket and the second bracket overlap with each other such that the first access hole and the second access hole form a port for a fastener.

In other variations, the airbag module includes at least two latch members and the hub portion includes at least two hook members, and/or port formed by the first access hole and the second access hole is at a 6-o'clock position about the steering wheel.

In yet another form, the present disclosure provides a steering wheel assembly that includes a steering wheel including a hub portion, an airbag module attached to the hub portion of the steering wheel, a latch fastener, and an access fastener. The airbag module has a front face and a back face that is opposite the front face and directed toward the hub portion of the steering wheel. The latch fastener is configured to attach the steering wheel and the airbag module at a first area. The latch fastener includes a latch member disposed at the back face of the airbag module and a hook member located at the hub portion of the steering wheel. The latch member has two arms extending from the back face and a bar member extending between the two arms. The hook member defines a slot configured to receive and engage with the bar member of the latch. The access fastener is configured to attach the steering wheel and the airbag module at a second area opposed to the first area. The access fastener includes a first bracket and a second bracket. The first bracket and the second bracket each define an access hole. The first bracket extends from the back face of the airbag module, the second bracket extends from the hub of the steering wheel, and with the airbag module attached to the hub portion, the first bracket and the second bracket overlap with each other such that the access holes defined by the first bracket and the second bracket form a port that receives a fastener.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
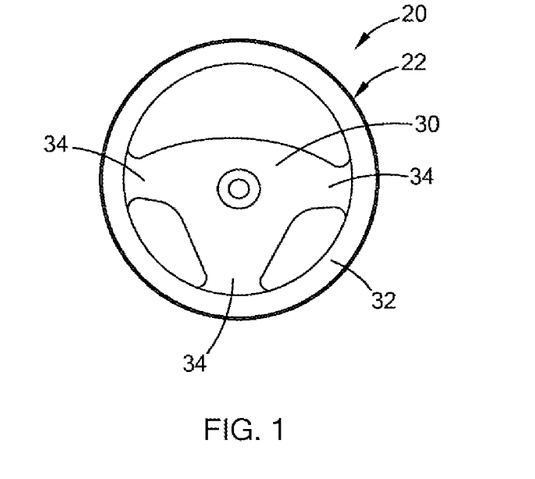
FIG. 1 is a front view of a steering wheel assembly according to the present disclosure.
Figure 2:
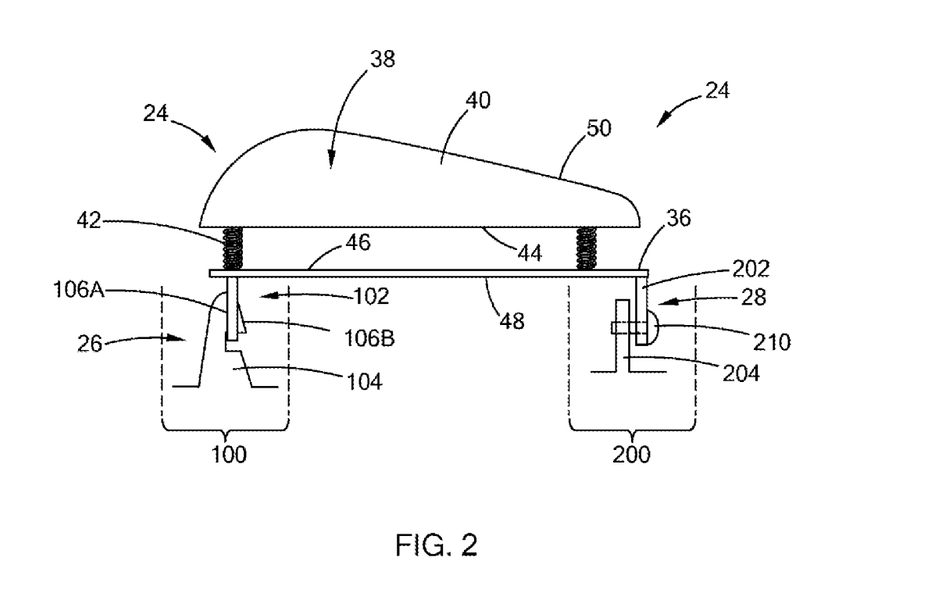
FIG. 2 is a partial side view of an airbag module attached to a steering wheel according to the present disclosure.

Referring to FIGS. 1 and 2, a steering wheel assembly according to the present disclosure is illustrated and generally indicated by the reference numeral 20. The steering wheel assembly 20 comprises a steering wheel 22, an airbag module 24, a latch fastener 26, and an access fastener 28. The steering wheel 22 includes a core assembly defining a hub portion 30, a rim portion 32, and spokes 34 extending from the hub portion 30 to connect the rim portion 32 and the hub portion 30.

The airbag module 24 is attached to the hub portion 30 of the steering wheel 22 and comprises a base plate 36 and a casing 38 configured to house an inflator and an airbag. The base plate 36 of the airbag module 24 comprises a top face 46, which is directed toward the casing 38, and a back face 48 that is opposite of the top face 46 and directed toward the hub portion 30 of the steering wheel 22. The casing 38 includes a bottom face 44 directed toward the base plate 36 and an outer surface 40 and front face 50 opposite the bottom face 44.

The casing 38 and the base plate 36 are connected by at least one resilient member 42 (e.g., spring member). For example, two resilient members are provided on opposed sides of the airbag module 24 and connect to the bottom face 44 of the casing 38 and to the top face 46 of the base plate 36. When a user applies sufficient pressure to the casing 38, the resilient members 42 compress causing the casing 38 to move toward the base plate 36. In one form, the compression of the resilient member 42 activates a horn disposed at another location of the vehicle. For example, a relay (not shown) is provided within the airbag module 24 and transmits an electric signal to the horn in response to the compression. When pressure is released, the resilient member 42 pushes against the casing 38 to return the casing 38 to its original position. Other suitable components may be used as the resilient member 42 and should not be limited to a spring.

Figure 3:
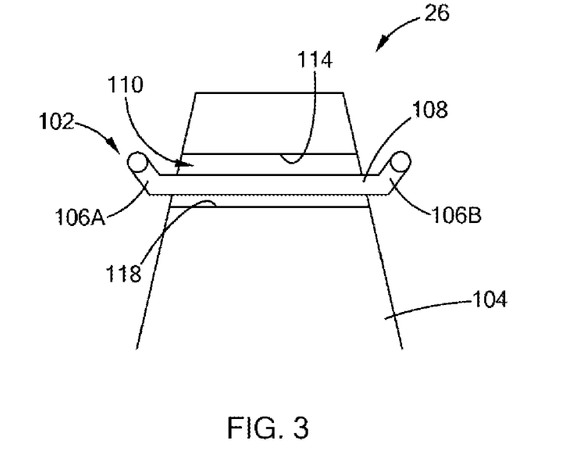
FIG. 3 illustrates a latch fastener having a latch member and a hook member according to the present disclosure.
Figure 4:
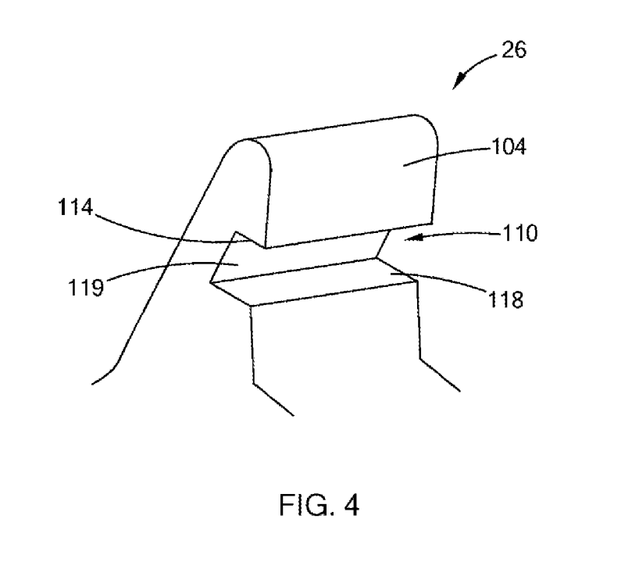
FIG. 4 is a perspective view of the hook member of the latch fastenerof fastener of FIG. 3.

The airbag module 24 is attached to the steering wheel 22 by way of the latch fastener 26 and the access fastener 28. Referring to FIGS. 2, 3, and 4, in one form, the latch fastener 26 is configured to attach the steering wheel 22 and the airbag module 24 at a first area 100 (FIG. 2) of the steering wheel assembly 20. The latch fastener 26 includes a latch member 102 extending from the back face 48 (FIG. 2) of the airbag module 24 and a hook member 104 located at the hub portion 30 of the steering wheel 22. The latch member 102 comprises two arms 106A,106B extending from the back face 48 of the base plate 36 of the airbag module, and a bar member 108 extending between the two arms 106A,106B (FIG. 3). In one form, the bar member 108 is provided as a linear bar extending between the arms 106A,106B. While not illustrated, the steering wheel assembly 20 may include multiple latch fasteners 26 to further control the placement and stability of the airbag module 24 mounted on the steering wheel 22.

The hook member 104 defines a slot 110 configured to receive and engage with the latch member 102. The slot 110 is defined by an upper surface 114, a lower surface 118, and a support surface 119 provided between the upper surface 114 and the lower surface 118. In the assembled state, the bar member 108 resides within the slot 110 with the arms 106A,106B extending on either side of the hook member 104. The hook member 104 having the slot 110 can be configured in various suitable ways for receiving the latch member 102, and should not be limited to example provided in the figures.

In another form of the present disclosure, the location of the latch member 102 and the hook member 104 are interchanged. For example, the latch member 102 may be provided at the hub portion 30 of the steering wheel 22 and the hook member 104 may be provided at the airbag module 24.

Figure 5:
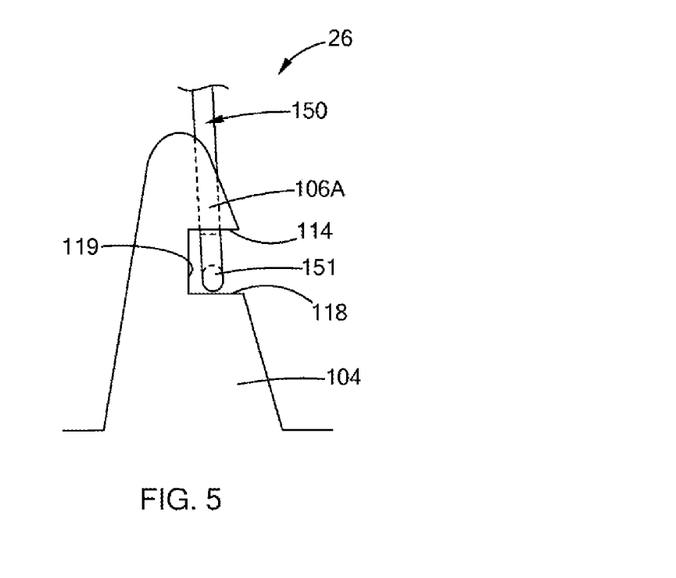
FIG. 5 is a side view of a latch fastener according to another form of the present disclosure.
Figure 6:
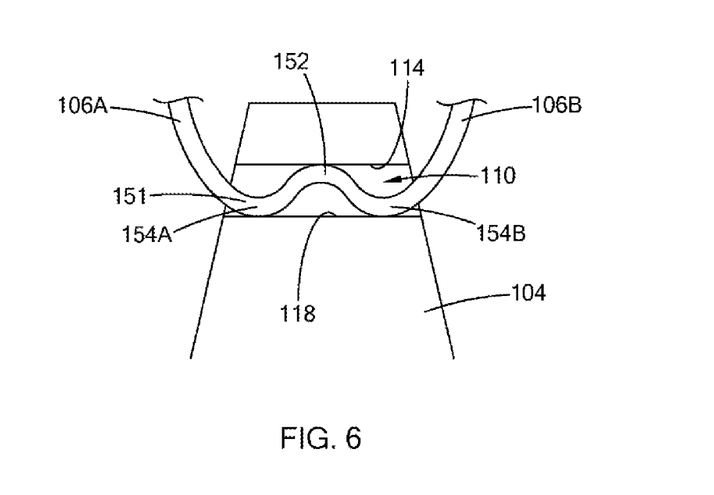
FIG. 6 illustrates the latch fastener of FIG. 5.

While FIG. 3 illustrates the bar member 108 having a linear configuration, it should be understood that the bar member 108 may be configured in other suitable ways to engage with the hook member 104. For example, referring to FIGS. 5 and 6, the latch fastener 26 includes a latch member 150 that has a bar member 151 having a curved configuration. In this form, the curved bar member 151 has a central arch 152 extending in a first direction and bow members 154A, 154B on each side of the central arch 152. In one form, when the airbag module 24 is attached, the central arch 152 is in contact with the upper surface 114 of the slot 110 and/or each bow member 154A, 154B is in contact with the lower surface 118 of the slot 110 to form an interference fit with the hook member 104. However, one skilled in the art would understand that the central arch 152 and/or each bow member 154A, 154B do not have to be in contact with the upper and lower surfaces 114, 118, respectively as long as the bar member 151 resides within the slot 110 of the hook member 104 in the assembled state.

Figure 7:
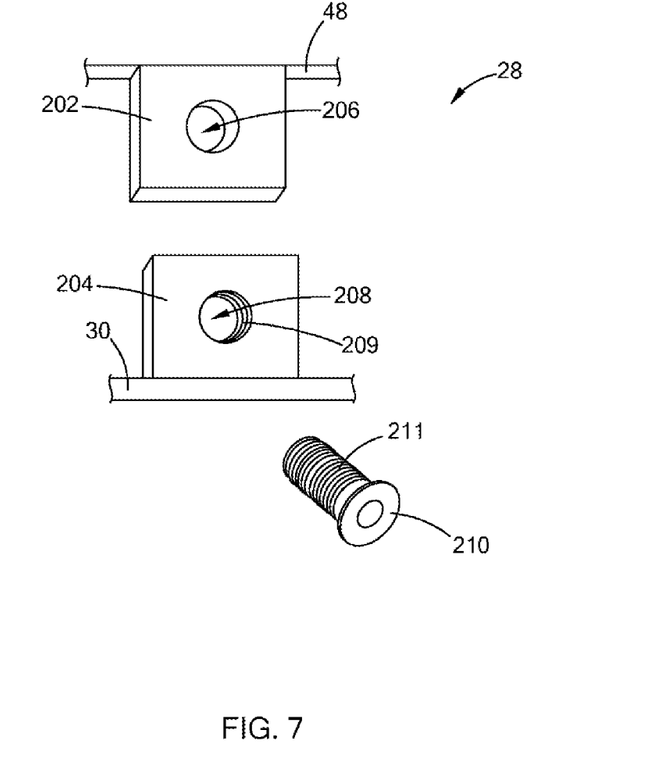
FIG. 7 is an exploded view of an access fastener according to the present disclosure.

Referring to FIGS. 2 and 7, the access fastener 28 is configured to attach the steering wheel 22 and the airbag module 24 at a second area 200 opposed to the first area 100. The access fastener 28 includes a first bracket 202 defining a first access hole 206 and a second bracket 204 defining a second access hole 208. In this form, the second access hole 208 further includes internal threads 209, which interacts with external threads 211 of a fastener 210, such as a bolt or screw (FIG. 7).

The first bracket 202 extends from the back face 48 of the base plate 36 of the airbag module 24 and the second bracket 204 extends from the hub portion 30 of the steering wheel 22. In one form, with the airbag module 24 attached, the first bracket 202 and the second bracket 204 extend parallel to each other, or overlap with each other, such that the access holes 206 and 208 defines a port for receiving the fastener 210. In particular, the fastener 210 first passes through the first access hole 206 before passing through the second access hole 208. Once the fastener 210 passes through the first access hole 206, the external threads 211 of the fastener 210 engages with the internal threads 209 of the second access hole 208 to fasten the airbag module 24 to the steering wheel 22. In another form, the positions of the first bracket 202 and the second bracket 204 may be switched such that the fastener 210 first passes through the second access hole 208 before passing through the first access hole 206. The internal threads may be provided with either the first bracket 202 or the second bracket 204, or both the first and second brackets 202 and 204.

Figure 8:
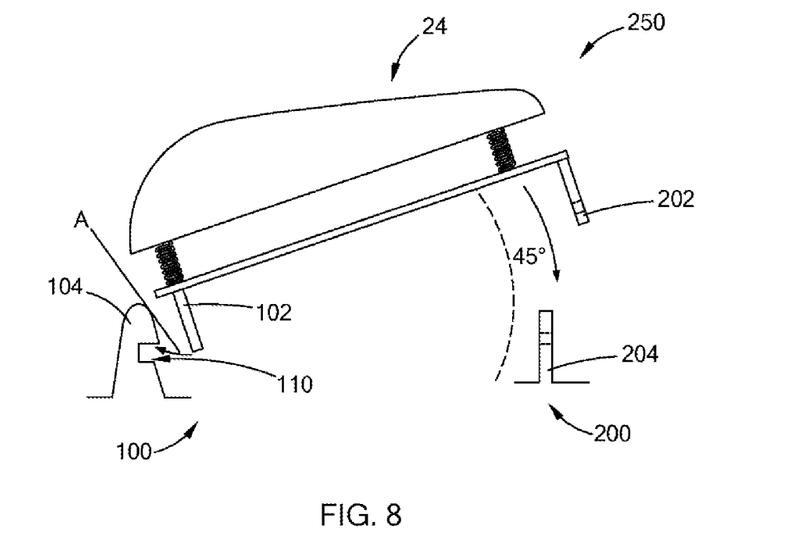
FIG. 8 illustrates an installation operation of the airbag module to the steering wheel according to the present disclosure.
Figure 9:
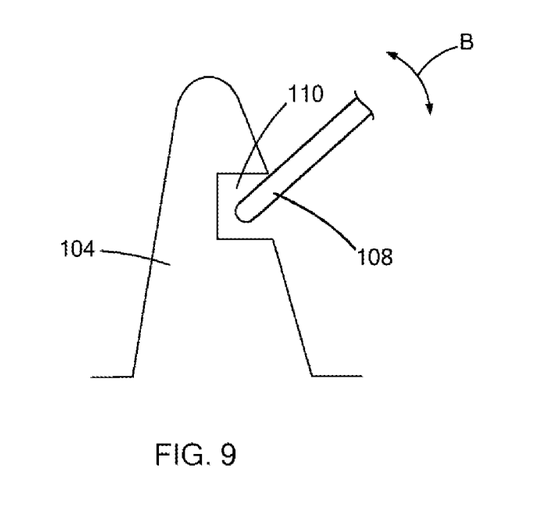
FIG. 9 illustrates the latch fastener of FIG. 8.

Turning now to FIGS. 8 and 9, a method for attaching the airbag module 24 to the hub portion 30 of the steering wheel 22 is provided. In the first area 100 of the steering wheel assembly 20, the latch member 102 is guided into the slot 110 of the hook member 104, as indicated by arrow A, at an angle. That is, the bar member 108 is aligned and positioned in (i.e., engaged with) the slot 110. In one example, the airbag module 24 is at, for example, a 45° angle relative to the steering wheel 22. Engagement between the bar member 108 and the hook member 104 allows the airbag module 24 to pivot relative to the steering wheel 22. The pivot action is represented by arrow B. While the latch member 102 having a linear bar member 108 is illustrated, the latch member 150 having the curved bar member 151 may also be used and installed in a similar manner.

With the bar member 108 engaged with the slot 110, the airbag module 24 is pivoted downward toward the steering wheel 22. Accordingly, the first bracket 202 of the access fastener 28 located on the airbag module 24 is pivoted towards the second bracket 204 located on the hub area 30 of the steering wheel 22 until the first access hole 206 of the first bracket 202 and the second access hole 208 of the second bracket 204 are aligned such that the first access hole 206 and the second access hole 208 define the port.

With the first and second access holes 206, 208 aligned, the fastener 210 is inserted in the first and second brackets 202, 204. Specifically, the fastener 210 engages with the internal threads 209 of the second access hole 208 after passing through the first access hole 202 to connect the first and second brackets 202, 204 together. Accordingly, the airbag module 24 is secured to the steering wheel 22 by way of the latch fastener 26 and the access fastener 28.

Figure 10:
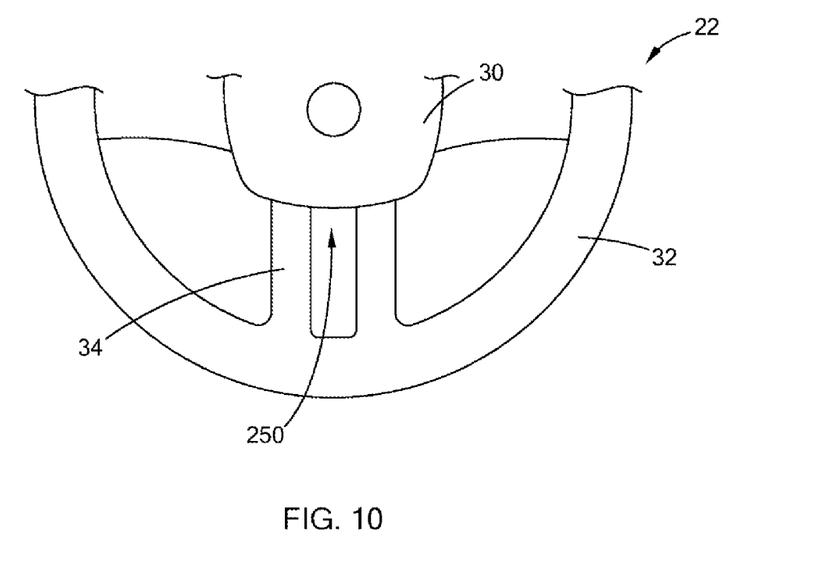
FIG. 10 is a partial view of a steering wheel according to the present disclosure.
Figure 11:
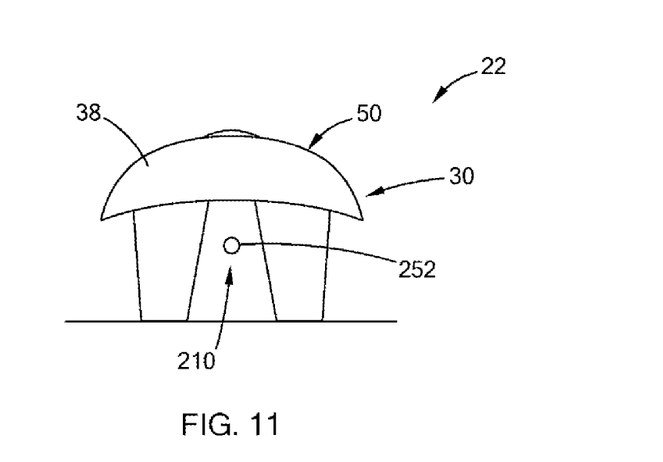
FIG. 11 illustrates an access hole of the steering wheel of FIG. 10.

Referring to FIGS. 10 and 11, to detach the airbag module 30 from the steering wheel 22, a user removes the fastener 210 via an opening 252 (FIG. 11). In one form, the access fastener 28 is arranged at a 6 o'clock position 250 about the steering wheel 22 when the airbag module 24 is attached, such that the opening 252 is below the front face 50 of the casing 38 and directed toward a driver seat. Accordingly, the opening 252 is out of sight of the driver. However, one skilled in the art would understand that the position of the opening 252 is not limited to the 6 o'clock position 250 and any suitable position about the steering wheel 22 may be implemented.

Using a tool, such as a screwdriver, the fastener 210 is unscrewed from the access holes 206, 208 of the first and second brackets 202, 204, respectively to decouple the airbag module 30 from the steering wheel 22 at the second area 200. Once the fastener 210 is removed, the airbag module 24 is pivoted away from the steering wheel 22 to release the latch member 102 from the hook member 104 and decouple the airbag module 30 from the steering wheel 22 at the first area 100.

The latch fastener and the access fastener of the present disclosure utilize one access hole for a single point of attaching/detaching the airbag module 30 to/from the steering wheel 22 while still providing a stable and secure engagement between the airbag module 30 and the steering wheel 22. In addition, the pivotable assembly and disassembly of the airbag module 30 provides additional clearance within the hub portion 30. The additional clearance allows non-traditional installation or part mating vectors to be utilized, such that components may be manufactured with unique die-draws within the tooling, thus enhancing the aesthetic appearance of sight lines and/or gaps that may result.

Further still, the location of the resilient members 42 in relation to the latch fastener 26 and access fastener 28 advantageously allows the base plate 36 of airbag module 24 and the steering wheel 22 to remain sturdily affixed to one another when the casing 38 is compressed by the driver to activate the horn. Thus, the attachment features of the latch fastener 26 and access fastener 28 do not move and provide increased stability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A steering wheel assembly, comprising:
   a steering wheel;
   an airbag module pivotably attached to the steering wheel by a latch fastener disposed at the airbag module, wherein the latch fastener engages a hook member disposed at the steering wheel; and
   an access fastener comprising a first bracket extending from the airbag module and a second bracket extending from the steering wheel, wherein the first bracket and the second bracket each define an access hole that forms a port for receiving another fastener to further attach the airbag module to the steering wheel.

2. The steering wheel assembly of claim 1, wherein the latch fastener comprises a bar member disposed at the airbag module and the hook member defines a slot disposed at the steering wheel configured to receive and engage with the bar member.

3. The steering wheel assembly of claim 2, wherein the bar member is a linear shaped bar.

4. The steering wheel assembly of claim 2, wherein the bar member is a curve-shaped bar having a central arch and a pair of bow members disposed on either side of the central arch.

5. The steering wheel assembly of claim 4, wherein at least one of the central arch and the pair of bow members contacts a respective surface of the slot.

6. The steering wheel assembly of claim 1, wherein the airbag module comprises an inflatable airbag and one or more of the airbag module and the steering wheel comprise a horn actuator.

7. An airbag module, comprising:
one of a latch fastener and a hook member adapted to engage another of the latch fastener and the hook member disposed at a steering wheel to pivotably attach the airbag module to the steering wheel; and
an access fastener comprising a first bracket extending from the airbag module adapted to engage a second bracket extending from the steering wheel, wherein the first bracket and the second bracket each define an access hole that forms a port for receiving a fastener to further attach the airbag module to the steering wheel.

8. The airbag module of claim 7, wherein the latch fastener comprises a bar member and the hook member defines a slot configured to receive and engage with the bar member.

9. The airbag module of claim 8, wherein the bar member is a linear shaped bar.

10. The airbag module of claim 8, wherein the bar member is a curve-shaped bar having a central arch and a pair of bow members disposed on either side of the central arch.

11. The airbag module of claim 10, wherein at least one of the central arch and the pair of bow members contacts a respective surface of the slot.

12. The airbag module of claim 7, further comprising one or more of an inflatable airbag and a horn actuator.

13. A steering wheel, comprising:
one of a latch fastener and a hook member adapted to engage another of the latch fastener and the hook member disposed at an airbag module to pivotably attach the airbag module to the steering wheel; and
an access fastener comprising a second bracket extending from the steering wheel adapted to engage a first bracket extending from the airbag module, wherein the second bracket and the first bracket each define an access hole that forms a port for receiving a fastener to further attach the airbag module to the steering wheel.

14. The steering wheel of claim 13, wherein the latch fastener comprises a bar member and the hook member defines a slot configured to receive and engage with the bar member.

* * * * *